US007577859B2

(12) United States Patent  
Bilak

(10) Patent No.: US 7,577,859 B2  
(45) Date of Patent: Aug. 18, 2009

(54) SYSTEM AND METHOD OF CONTROLLING POWER CONSUMPTION IN AN ELECTRONIC SYSTEM BY APPLYING A UNIQUELY DETERMINED MINIMUM OPERATING VOLTAGE TO AN INTEGRATED CIRCUIT RATHER THAN A PREDETERMINED NOMINAL VOLTAGE SELECTED FOR A FAMILY OF INTEGRATED CIRCUITS

(75) Inventor: Mark Bilak, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/708,270

(22) Filed: Feb. 20, 2004

(65) Prior Publication Data

US 2005/0188230 A1    Aug. 25, 2005

(51) Int. Cl.  
*G06F 1/00* (2006.01)  
*G06F 1/32* (2006.01)  
*G01R 15/00* (2006.01)

(52) U.S. Cl. .................. 713/320; 713/300; 702/57; 702/62; 702/64; 702/117

(58) Field of Classification Search ................ 713/300, 713/320, 322, 500, 600; 702/57, 62, 64, 702/117, 118, 122  
See application file for complete search history.

(56) References Cited

U.S. PATENT DOCUMENTS 3,881,181 A    4/1975  Khajezadeh  
4,670,731 A    6/1987  Zeile et al.

5,086,501 A  *  2/1992  DeLuca et al. .............. 713/300  
5,557,558 A     9/1996  Daito (Continued)

FOREIGN PATENT DOCUMENTS

JP        2001142589 A  *  5/2001

OTHER PUBLICATIONS

Justice Tricia, What is guard band?, Apr. 1997, Credence Systems Corp.*

*Primary Examiner*—Mark Connolly  
(74) *Attorney, Agent, or Firm*—Joseph P. Abate; Mark Bilak; Daryl K. Neff

(57) ABSTRACT

A method and apparatus for adaptively adjusting the operating voltage of an integrated circuit in response to tester-to-system variations, worst-case testing techniques, process variations, temperature variations, or reliability wearout mechanisms. The minimum operating voltage of an integrated circuit is determined either during external testing of the integrated circuit or during built-in-self-testing. The minimum operating voltage is transmitted to a variable voltage regulator where it is used to set the output of the regulator. The output of the regulator supplies the integrated circuit with its operating voltage. This technique enables tailoring of the operating voltage of integrated circuits on a part-by-part basis which results in power consumption optimization by adapting operating voltage in response to tester-to-system variations, worst-case testing techniques, process variations, temperature variations or reliability wearout mechanisms. Alternatively, the invention enables adaptive adjustment of the operating frequency of an integrated circuit. The invention enables system designers to adaptively optimize either system performance or power consumption on a part-by-part basis in response to tester-to system variations, worst-case testing techniques, process variations, temperature variations or reliability wearout mechanisms.

17 Claims, 9 Drawing Sheets

U.S. PATENT DOCUMENTS

| | | |
|---|---|---|
| 5,638,382 A | 6/1997 | Krick et al. |
| 5,689,179 A | 11/1997 | Walker |
| 5,692,201 A * | 11/1997 | Yato .......................... 713/322 |
| 5,764,655 A | 6/1998 | Kirihata et al. |
| 6,009,139 A | 12/1999 | Austin et al. |
| 6,035,407 A * | 3/2000 | Gebara et al. ............... 713/300 |
| 6,040,725 A | 3/2000 | Lee et al. |
| 6,046,492 A | 4/2000 | Machida et al. |
| 6,058,030 A | 5/2000 | Hawkes et al. |
| 6,061,811 A | 5/2000 | Bondi et al. |
| 6,425,086 B1 | 7/2002 | Clark et al. |
| 6,433,525 B2 | 8/2002 | Muratov et al. |
| 6,496,729 B2 | 12/2002 | Thompson |
| 6,515,530 B1 | 2/2003 | Boerstler et al. |
| 6,522,207 B1 | 2/2003 | Boerstler et al. |
| 6,564,348 B1 | 5/2003 | Barenys et al. |
| 6,601,179 B1 | 7/2003 | Jackson et al. |
| 6,912,665 B2 * | 6/2005 | Ellis et al. .................... 713/401 |
| 7,017,063 B2 * | 3/2006 | Morse et al. ................. 713/340 |
| 7,100,061 B2 * | 8/2006 | Halepete et al. ............. 713/322 |

* cited by examiner

SYSTEM AND METHOD OF CONTROLLING POWER CONSUMPTION IN AN ELECTRONIC SYSTEM BY APPLYING A UNIQUELY DETERMINED MINIMUM OPERATING VOLTAGE TO AN INTEGRATED CIRCUIT RATHER THAN A PREDETERMINED NOMINAL VOLTAGE SELECTED FOR A FAMILY OF INTEGRATED CIRCUITS

BACKGROUND OF INVENTION

The present invention relates to controlling power consumption of an electronic component within an electronic system. Alternatively, the present invention relates to controlling operating frequency of an electronic component within an electronic system.

Power consumption increasingly has become a major obstacle to circuit and system designers. Advances in integrated circuit (IC) technology have resulted in millions of transistors being placed on single ICs. Additionally, IC technology advances also enable circuits to switch at increasingly faster speeds. As the physical sizes of ICs continue to shrink while at the same time performance (i.e. switching speed) increases, power density substantially increases. This substantial increase in power density causes power management problems for system designers. Power management problems take form in both heat dissipation and battery life issues. Greater power dissipated by ICs with ever decreasing area causes significant temperature control issues at the system level. The problem has become so pervasive that conventional forced air cooling systems are no longer able to dissipate the power generated by modern ICs. System designers are being forced to utilize liquid cooled solutions for dissipating ever increasing power requirements. Increased power consumption also creates battery life issues in portable systems and can significantly impact the usefulness of portable devices.

Power consumption in ICs comes from two components: Static and Dynamic power. Static power consumption ($P_{static}$) results from (1) leakage current and (2) sub-threshold conductance and is characterized by the following equation: $P_{static} = I_{leakage} \times V_{DD}$. Dynamic power consumption ($P_{dynamic}$) results from (1) capacitive power due to charging/discharging of capacitive loads and (2) short-circuit power due to direct path currents when there is a temporary connection between power and ground (e.g. when both p and n transistors are "on" in CMOS circuits) and is characterized by the following equation: $P_{dynamic} = \frac{1}{2} \times C_L \times V_{DD}^2 \times F_{operating}$. Further complicating increases in IC power consumption is manufacturing test. Cost considerations limit the amount of test time that can be dedicated to each IC. Manufacturing test cost concerns often limit the amount of characterization testing that can be done on any one IC (testing the part across a range of temperature, voltage and frequency to ensure robust operation). ICs are often tested at worst-case system operating conditions and at some fixed frequency (e.g. "speed" sorting) to assure all ICs shipped will function properly in the end system.

For example, microprocessors may be tested at some fixed frequency (at which they are expected to function in a system), a maximum temperature and a minimum operating voltage. Although a few of these processors may operate marginally at those conditions (and some will fail), most that function at those minimum requirements will operate well beyond those limits. This is mainly due to variations within the semiconductor manufacturing process (e.g. threshold voltage, transistor channel length, and gate oxide variations). A normal distribution often describes how a sample of parts will behave beyond those limits. Except for that small number of parts that are marginal, most parts are capable of operating at frequencies above the minimum test frequency. However, because of time constraints, this maximum operating speed is not determined. It is well known in the art that a circuit's operating speed is proportional to its operating voltage. The lower the voltage, the lower the speed (and vice-versa). See FIG. 1 for an illustration of the frequency/voltage response 10 where the slope of the curve 12 (Delta V/Delta F) represents the amount of performance change (Delta F) expected for some change in operating voltage (Delta V). The extreme operating conditions of the IC are identified by the minimum operating voltage 14 (Vmin), minimum operating frequency 16 (Fmin), maximum operating voltage 18 (Vmax), and maximum operating frequency 20 (Fmax). Beyond these conditions, the IC no longer functions properly.

Therefore, for the majority of ICs that are capable of functioning beyond the minimum test frequency, their operating voltage may be lowered until the part functions just above the minimum system frequency.

Furthermore, it is well known in the art that a circuit's operating speed is inversely proportional to temperature. The lower the system temperature, the faster the speed (and vice-versa). See FIG. 2 for an illustration of the frequency/temperature response 30 where the slope of the curve 32 (Delta T/Delta F) represents the amount of performance change (Delta F) expected for some change in operating temperature (Delta T). The extreme operating conditions of the IC are identified by the minimum operating temperature 34 (Tmin), minimum operating frequency 36 (Fmin), maximum operating temperature 38 (Tmax), and maximum operating frequency 40 (Fmax). Beyond these conditions, the IC no longer functions properly.

By limiting manufacturing testing to pass/fail testing at worst-case system requirements, end system power consumption is adversely affected in two ways: (1) most ICs that function at the minimum system speed at test will function well beyond it in the end system and (2) most ICs do not operate at the maximum system temperatures at which they are typically tested; and thus, their operating voltage may be lowered. Additionally, variations in the tester environment may also add to measurement inaccuracies.

For example, an IC which has enough margin to function at the required system operating frequency at a voltage of 1.6V instead of a nominal voltage of 1.8V, the power savings realized by operating the IC at 1.6V instead of 1.8V would be: (1) 21% dynamic power reduction and (2) 11% static power reduction.

This problem is exasperated in portable devices because battery life is unnecessarily degraded when an IC is operated at worst-case system conditions although the system rarely (or never) actually operates at such worst-case conditions and the IC is capable of functioning properly below the worst-case conditions.

Finally, the problems associated with manufacturing test and end system operation previously described may be utilized to achieve more than reduced power consumption. Because system components are tested at worst-case conditions as previously described, many parts have additional performance margin. Instead of, or in addition to, adjusting operating voltage to reduce power consumption, the voltage may remain at nominal system conditions, or increased, so that an IC may function at increased frequencies, thus improving system performance. The same temperature/voltage relationships previously mentioned may be utilized to achieve such results.

(1) Clock Control: numerous techniques exist for managing power consumption by controlling clocking. Depending on processing demand, clock frequency may be increased or decreased to meet that demand. Thus, during low demand periods, clock frequency may be lowered, thereby saving power. Clock frequency is increased only to satisfy demand. Also, clock throttling is common.

(2) U.S. Pat. No. 6,496,729, entitled Power consumption reduction in medical devices employing multiple supply voltages and clock frequency control, by Thompson: Teaches a method for tailoring supply voltages to specific circuits. Thus, each circuit receives a tailored operating voltage as opposed to all circuits receiving the same voltage. For example, low performance circuits may be powered at a lower operating voltage because they do not need to operate at maximum speeds. Only those circuits requiring maximum performance receive higher operating voltages. Additionally, this patent teaches alternating between a lower operating voltage and a higher operating voltage depending on the expected workload for a given cycle. For example, if cycle one does not require peak performance, a lower operating voltage is supplied. If cycle two requires maximum performance, a higher operating voltage is supplied. This patent does not teach or suggest a means for adjusting operating voltage based upon tester-to-system variations, worst-case testing techniques, or process variations. Furthermore, this patent does not teach or suggest the use of a built-in-self-test engine for determining the minimum operating voltage of an integrated circuit throughout its useful life.

(3) U.S. Pat. No. 6,601,179, entitled Circuit and method for controlling power and performance based on operating environment, by Jackson et al.: Teaches a system and method for adjusting processor clock frequency and operating voltage based upon the operating environment. For example, if the processor is "docked" into a system that has cooling capabilities, the processor can be run at lower operating conditions, thereby lowering power. This patent does not teach or suggest a means for adjusting operating voltage based upon tester-to-system variations, worst-case testing techniques, or process variations. Furthermore, this patent does not teach or suggest the use of a built-in-self-test engine for determining the minimum operating voltage of an integrated circuit throughout its useful life.

(4) U.S. Pat. No. 6,425,086, entitled Method and apparatus for dynamic power control of a low power processor, by Clark et al.: Teaches a method and apparatus for dynamically controlling power of a microprocessor by adjusting the operating voltage of the microprocessor. The method and apparatus includes a variable voltage regulator, a memory element and a processor. The output of the regulator is adjusted according to the processing load of the processor. The memory contains processor instructions, that when executed by the processor, result in modifications to the operating frequency of the processor. The regulator is adjusted accordingly depending upon the dynamic changes in the processing load of the processor. This patent does not teach or suggest a means for adjusting operating voltage based upon tester-to-system variations, worst-case testing techniques, or process variations. Furthermore, this patent does not teach or suggest the use of a built-in-self-test engine for determining the minimum operating voltage of an integrated circuit through its useful life.

SUMMARY OF INVENTION

The present inventor believes that the prior art has at least the following drawbacks: An object of the invention is to adaptively adjust the operating voltage of an integrated circuit in response to tester-to-system variations, worst-case testing techniques or process variations.

Another object of the invention is to adaptively adjust the operating voltage of an integrated circuit in response to built-in-self-test results.

Another object of the invention is to adaptively adjust the operating voltage of an integrated circuit throughout the useful life of the integrated circuit in response to built-in-self-test results.

Another object of the invention is to adaptively adjust the operating voltage of an integrated circuit in response to the operating temperature of the integrated circuit.

Another object of the invention is to adaptively adjust the operating frequency of an integrated circuit in response to tester-to-system variations, worst-case testing techniques or process variations.

Another object of the invention is to adaptively adjust the operating frequency of an integrated circuit in response to built-in-self-test results.

Another object of the invention is to adaptively adjust the operating frequency of an integrated circuit throughout the useful life of the integrated circuit in response to built-in-self-test results.

Another object of the invention is to adaptively adjust the operating frequency of an integrated circuit in response to the operating temperature of the integrated circuit.

Further and still other objects of the present invention will become more readily apparent when the following detailed description is taken in conjunction with the accompanying drawing figures.

DETAILED DESCRIPTION

Figure 3:
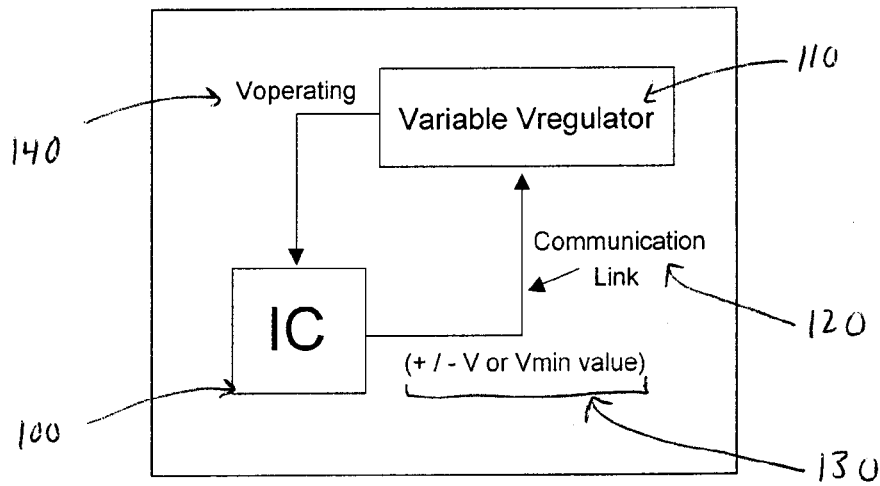
FIG. 3 is a diagram illustrating an end system incorporating an adaptive feedback mechanism for controlling the operating voltage of an integrated circuit according to the present invention.

FIG. 3 illustrates the preferred embodiment of the invention. The integrated circuit 100 (IC) and variable voltage regulator 110 (Vregulator) are two components contained within an end system such as a personal computer, portable electronic device, printer, etc. IC 100 may be any integrated circuit type. Vregulator 110 may be any variable voltage regulator capable of supplying some range of voltage to the IC. For example, variable regulator 110 may be capable of supplying 1.8V±200 mV at 50 mV increments. The output 140 of Vregulator 110 is supplied to IC 100 as its operating voltage over a power line. Power line connections between power supplies and electronic components are well known in the art. Variable voltage regulators, like the one illustrated in FIG. 3, are well known in the art. For example, such regulators are described more fully in: U.S. Pat. No. 5,689,179, entitled Variable Voltage Regulator System, by Walker; U.S. Pat. No. 6,058,030, entitled Multiple Output DC-to-DC Converter Having Enhanced Noise Margin and Related Methods, by Hawkes et al.; and U.S. Pat. No. 6,433,525, entitled DC to DC Converter Method and Circuitry, by Muratov et al., the subject matter of which are hereby incorporated by reference in their entirety.

IC 100 is linked with Vregulator 110 via communication link 120 so that the IC may communicate with the regulator, thus enabling transmission of data from IC 100 to Vregulator 110. Methods for providing communication links between electronic equipment are well known in the art. For example, the IC may be linked to the regulator by a simple unidirectional signal line, a bus or a wireless link.

The minimum operating voltage ("Vmin") of IC 100 is the minimum voltage at which the IC will function properly (e.g. all functional paths of the IC work properly) at some fixed frequency. In other words, Vmin represents the minimum voltage at which the slowest functional path(s) within the IC will still function properly at some fixed frequency. The slowest functional path(s) within the IC will not function properly if the operating voltage of the IC drops below Vmin. Vmin of IC 100 is stored in the IC during external test (e.g. manufacturing test). This may be accomplished using a number of components well known in the art such as EEPROM, non-volatile memory, ROM, flash memory, fuses, antifuses, etc. Vmin may be reduced by some amount to account for inaccuracies in the test measurement (e.g. guardband). The stored Vmin value is the minimum voltage at which the IC will function properly in the end system. IC 100 transmits voltage control information 130 (e.g. Vmin plus guardband) to Vregulator 110 over link 120 as either an increment/decrement signal or as a data signal representing the value of Vmin.

Figures 4A, 4B:
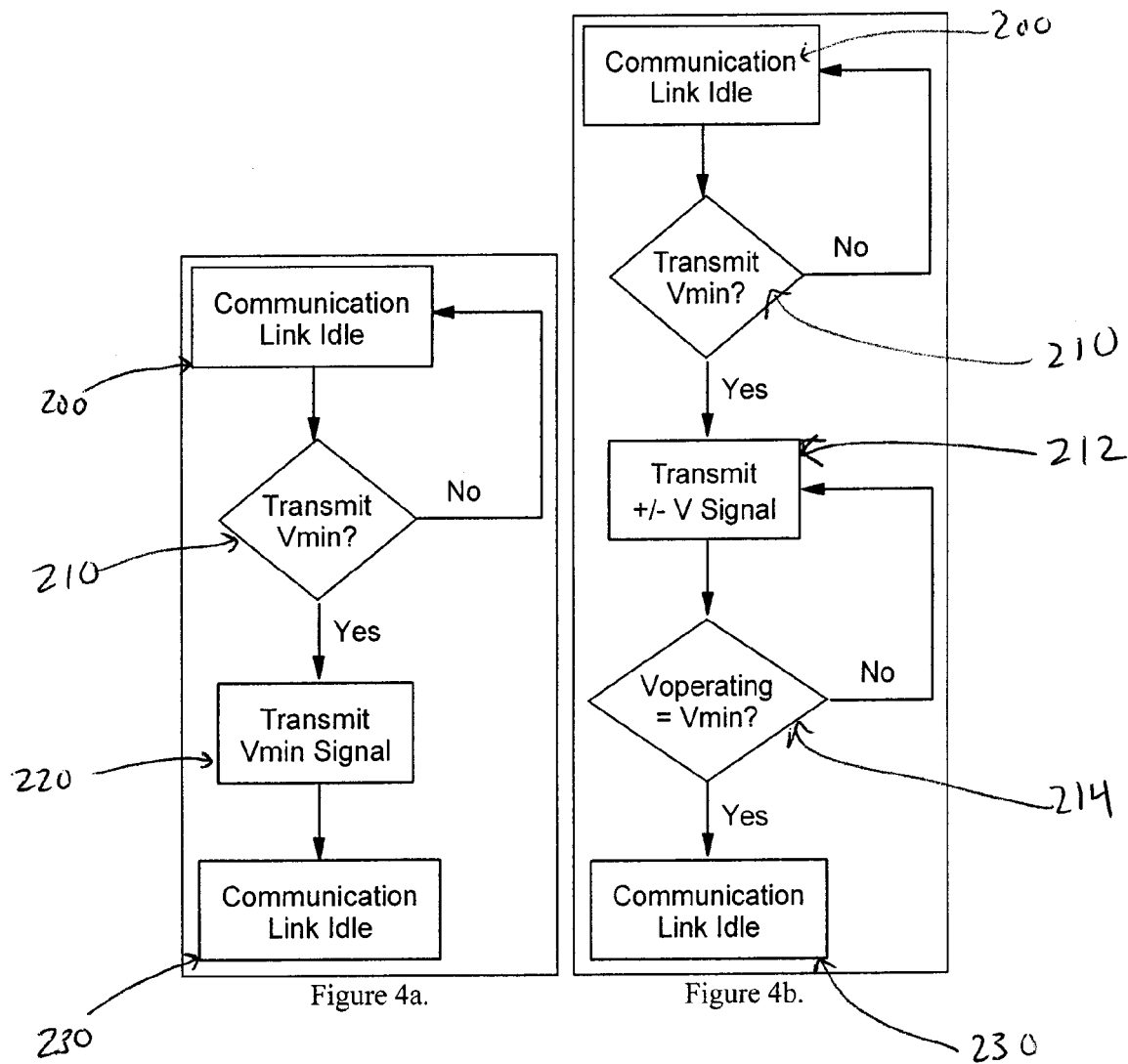
FIG. 4a is a diagram illustrating a method for transmitting voltage control information from an integrated circuit to a variable voltage regulator according to the present invention.
FIG. 4b is a diagram illustrating an alternate method for transmitting voltage control information from an integrated circuit to a variable voltage regulator according to the present invention.

The process by which the variable regulator's output voltage is set to Vmin is illustrated in FIG. 4a, or alternatively, FIG. 4b. FIG. 4a illustrates one embodiment for setting the output of the Vregulator to Vmin. In this embodiment, the value of Vmin is transmitted as a signal that represents that value. Upon system power up, the system is initialized, including all of its components. Initially, the communication link is idle 200. During initialization, the Vregulator provides some predetermined voltage to the IC. This predetermined value is a value at which all ICs are expected to function in the end system (e.g. nominal or worse-cast value). Because only a few of the ICs will actually need to operate at this value to meet performance requirements, most ICs can be operated at a lower voltage and still satisfy the performance requirements.

Based upon the stored value of Vmin, the IC determines whether the Vregulator must increase, decrease, or not change the predetermined voltage value 210. This determination is made by the IC using a comparison technique whereby the IC compares the predetermined voltage with the stored value of Vmin. If the IC determines that the predetermined value must be changed, the IC transmits a signal that represents the value of Vmin to the Vregulator over the communication link 220. If no change is required, the IC transmits nothing to the Vregulator and the link remains idle 200. When the Vregulator receives a Vmin signal from the IC, it programs its output voltage in accordance with the Vmin signal. The output of the Vregulator is supplied to the IC as its operating voltage (Voperating). Therefore, Voperating will either remain the same as the predetermined voltage, be increased by some amount above the predetermined voltage, or be decreased by some amount below the predetermined voltage. When the IC is not communicating with the Vregulator, the communication link remains idle 230 (i.e. no signal transmissions).

FIG. 4b illustrates an alternate embodiment for setting the output of the Vregulator to Vmin. In this embodiment, Vmin is transmitted as an increment/decrement signal. This signal represents a fixed amount by which the Vregulator will either increment or decrement its output by. During system power up, the system is initialized, including all of its components. Initially, the communication link is idle 200. During initialization, the variable voltage regulator provides some predetermined voltage to the IC. This predetermined value is a value at which all ICs are expected to function in the end system (e.g. nominal or worse-cast value). Because only a few of the ICs will actually need to operate at this value to meet performance requirements, most ICs can be operated at a lower voltage and still satisfy the performance requirements.

Based upon the stored value of Vmin, the IC determines whether the Vregulator must increase, decrease, or not change the predetermined voltage value 210. This determination is made by the IC using a comparison technique whereby the IC compares the predetermined voltage with the stored value of Vmin. If no change is required, the IC transmits nothing to the Vregulator and the link remains idle 200. If the IC determines that the predetermined value must be changed, the IC transmits the increment/decrement signal to the Vregulator over the communication link 212 (e.g. increment signals if the output of the Vregulator must be increased, decrement if it must be decreased). When the Vregulator receives the increment/decrement signal from the IC, it programs its output voltage in accordance with that signal. The IC then determines whether the Vregulator must further increase or decrease its output so that it matches Vmin 214. If the output of the Vregulator does not match Vmin as determined by the IC, the IC again transmits the increment/decrement signal to the Vregulator over the communication link 212. This process is repeated until the output of the Vregulator matches Vmin (or is within some tolerance amount). The output of the Vregulator is supplied to the IC as its operating voltage (Voperating). Therefore, Voperating will either remain the same as the predetermined voltage, be increased by some amount above the predetermined voltage, or be decreased by some amount below the predetermined voltage. When the IC is not communicating with the regulator, the communication link remains idle 230 (i.e. no signal transmissions).

This process enables Voperating to be uniquely tailored for individual ICs. This process of adjusting the output of the Vregulator may occur during the IC initialization routine or at some point later in time (e.g. during normal operation).

Vmin is determined during testing of the IC (typically by an external tester during manufacturing test). Various techniques are well known in the art for determining the Vmin of an IC using an external tester. For example, a microprocessor's Vmin may be determined with an external tester by exercising the microprocessor with functional patterns (in the form of instructions) at some fixed frequency and at various operating voltages. This process may begin at a relatively high voltage and then be repeated at successively lower voltages until the microprocessor no longer functions as expected. The last voltage where the IC functioned properly would be its Vmin. Another technique is testing the IC with an external tester at a relatively low voltage and then repeating that test at successively lower voltages until the microprocessor no functions as expected. The first voltage where the IC functioned properly would be its Vmin. Another technique is testing the IC with an external tester at a relatively high voltage and then repeating the test at a relatively low voltage. If the part functions at both extremes, its Vmin would be the lowest test voltage. If the part fails, the tester would test the processor at a voltage halfway in between the upper and lower voltages. This process would continue until the processor's Vmin is determined. Vmin is then stored in the IC. Other techniques for determining Vmin using external testers are well know in the art and this invention is not limited by the ones previously described.

Figure 5:
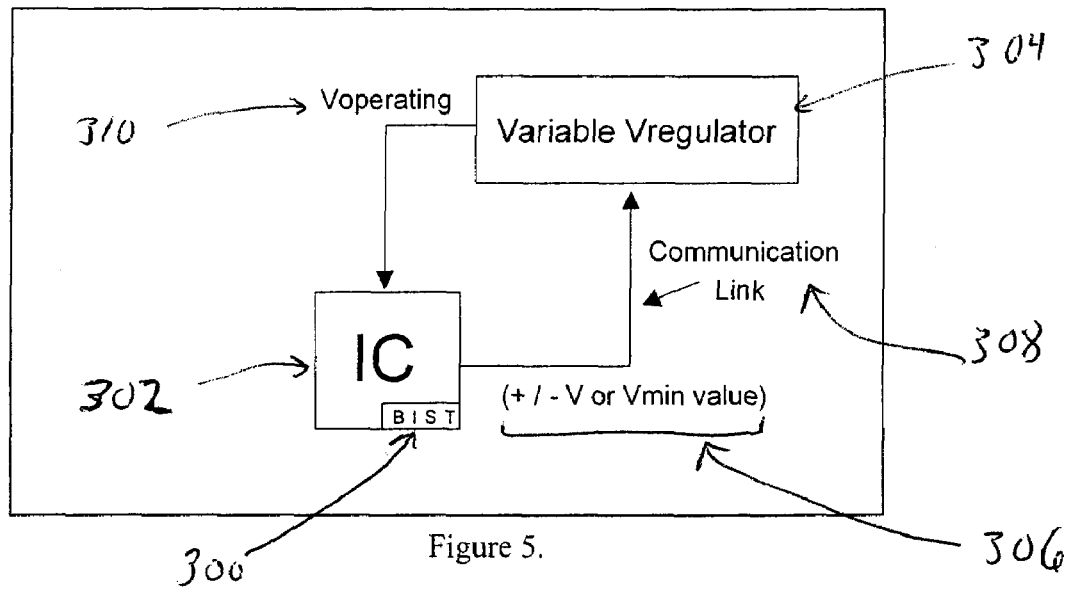
FIG. 5 is a diagram illustrating an end system incorporating an adaptive feedback mechanism for controlling the operating voltage of an integrated circuit in response to built-in-self-test results according to the present invention.

FIG. 5 illustrates a second embodiment where IC 302 is capable of self-testing, which is performed by a built-in-self-test ("BIST") engine, so that Vmin may be determined while the IC is in the end system. Preferably, self-testing is performed during IC initialization in order to minimize potential system interruption. This may occur during each IC initialization or may occur at some interval of initializations (e.g. every 10th initialization, self-testing is performed). Self-testing may be performed during normal operating conditions or any other time when the IC is in the end system (e.g. idle state). In addition to optimizing power consumption, this embodiment also provides a means for adjusting the operating voltage of an IC throughout its useful life. As is well know in the art, IC performance degrades over time as a result of reliability wearout mechanisms. For example, IC performance will decrease as a result of hot electron degradation which causes damage at the gate/drain interface of transistors, thus raising the threshold voltage (Vt) of the transistor. As a transistor's Vt is increased, more time is required to invert the channel of the transistor, thus degrading the transistor's performance. Another reliability wearout mechanism is electromigration. Electromigration results in the displacement of metal wiring within ICs due to movement of electrons through the wires. This displacement increases wire resistance and possibility coupling capacitance, thus degrading the performance of an IC. Vmin of an IC may be adjusted to compensate for wearout-induced performance degradation. By increasing Vmin sufficiently enough, the performance requirements of an IC still may be satisfied, thus preventing failure of an IC in the end system. Wearout-induced performance degradation may be compensated for by adjusting Vmin according to the self-test embodiment described herein. Because the IC has the capability of routinely determining Vmin throughout its useful life, any performance degradation may be compensated for using the system and method described herein.

BIST engine 300 may exist separately from IC 302 or may be physically contained within IC 302 as illustrated in FIG. 5. BIST engine 300 may include an interrupt procedure, IC 302 may include an interrupt procedure or IC 302 may be interrupted externally when it is time to perform self-testing. BIST engine 300 is programmed such that it is capable of testing IC 302 with test patterns that exercise the timing critical paths within IC 302. Since these paths have the least amount of timing margin, if they are capable of functioning at some voltage, then so will all other paths within the chip. Thus, only small subsets of the IC's paths are tested to determine the minimum operating voltage of the IC when in the end system. BIST engines and the operation thereof are well known in the art. For example, such BIST engines are described more fully in: U.S. Pat. No. 5,557,558, entitled Microprocessor with self-diagnostic test function, by Daito; U.S. Pat. No. 5,638,382, entitled Built-in Self Test Function for a Processor Including Intermediate Test Results, by Krick et al.; U.S. Pat. No. 5,764,655, entitled Built-in Self Test with Memory, by Kirihata et al.; U.S. Pat. No. 6,061,811, entitled Circuits, Systems, and Methods for External Evaluation of Microprocessor Built-in Self-test, by Bondi et al.; and U.S. Pat. No. 6,564,348, entitled Method and Apparatus for Storing and Using Chipset Built-in self-test Signatures, by Barenys et al., the subject matter of which are hereby incorporated by reference in their entirety.

Test patterns may be stored in IC 302 (e.g. EEPROM, non-volatile memory, ROM, flash memory, fuses, antifuses, etc.) or supplied from some external source (e.g. external memory, microprocessor, hard-drive, system program, etc.). When IC 302 enters self-test mode, BIST engine 300 is initialized and BIST engine 300 accesses the test patterns that it will use to exercise the IC's slowest paths at different operating voltages. The minimum voltage at which all patterns function properly is selected as the IC's Vmin. Vmin may be stored in the IC or externally and is supplied to Vregulator 304. This value may be reduced by some amount to account for inaccuracies (e.g. guard-band). IC 302 transmits voltage control information 306 (e.g. Vmin plus guardband) to Vregulator 304 over communication link 308 as either an increment/decrement signal or as a data signal representing the value of Vmin as previously described and illustrated in FIG. 3. Vregulator 304 sets its output voltage 310 to Vmin, which is the operating voltage of the IC (Voperating), as previously described and illustrated in FIGS. 4a and 4b.

The test patterns used by the BIST engine are determined during the IC design phase using timing analysis techniques. It is well known in the art to perform static timing analysis on IC designs in order to identify timing margins of that design, and thus, the timing critical paths within that design. This analysis determines the amount of excess timing resource in a given path within the IC. Static timing analysis propagates signals through logic-gates and interconnects, adding up delays along the paths. Arrival times (ATs) for all timing points in the design are computed for both rising and falling clock edges. Both slow and fast paths are identified by propagating both latest and earliest ATs for the same signal edge.

These calculated ATs are then checked against required arrival times (RATs), which have been propagated back upstream through the logic. The checks (e.g. setup and hold) and their guard-times are coded into the timing models of the gates. The difference between RAT and AT, which is commonly referred to as "slack", is the amount of excess timing resource in a given path. A positive slack on all tests in the design signifies that all tests have been met and the design will work at the asserted conditions and cycle-time. The timing critical paths within an IC (i.e. the paths that require the most amount of time to propagate a signal) are identifiable using static timing analysis. Patterns are developed that exercise these timing critical paths. These patterns are used by the BIST engine to exercise the timing critical paths of the IC.

Figure 6:
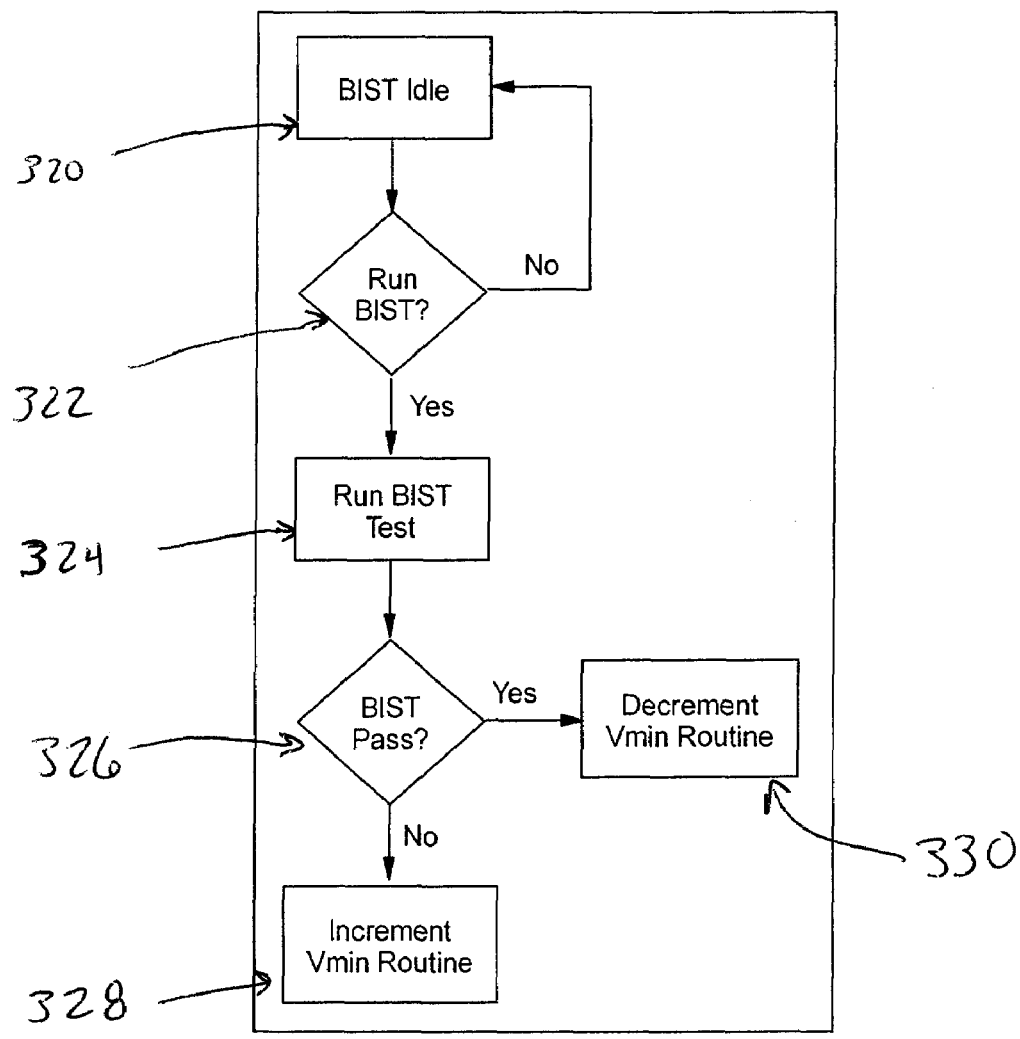
FIG. 6 is a diagram illustrating a method for determining the minimum operating voltage of an integrated circuit in response to built-in-self-test results according to the present invention.

FIG. 6 illustrates the process by which an IC's Vmin is determined using the self-test embodiment. Initially, the BIST engine is idle 320. The BIST engine is first initialized upon receiving instruction to do so from either the IC or an external component 322 (e.g. microprocessor). Next, the BIST engine begins the self-test routine 324. As previously explained, the IC is initially powered on at some predetermined voltage at which the IC is expected to work, and thus, the initial self test is performed at this voltage. If the self test fails at 326, the BIST engine executes the "Increment Vmin" routine 328. If the self test passes at 326, the BIST engine executes the "Decrement Vmin" routine 330. Both of the routines illustrated in FIGS. 7 and 8 adjust the minimum operating voltage of the IC to an optimal level.

Figure 7A:
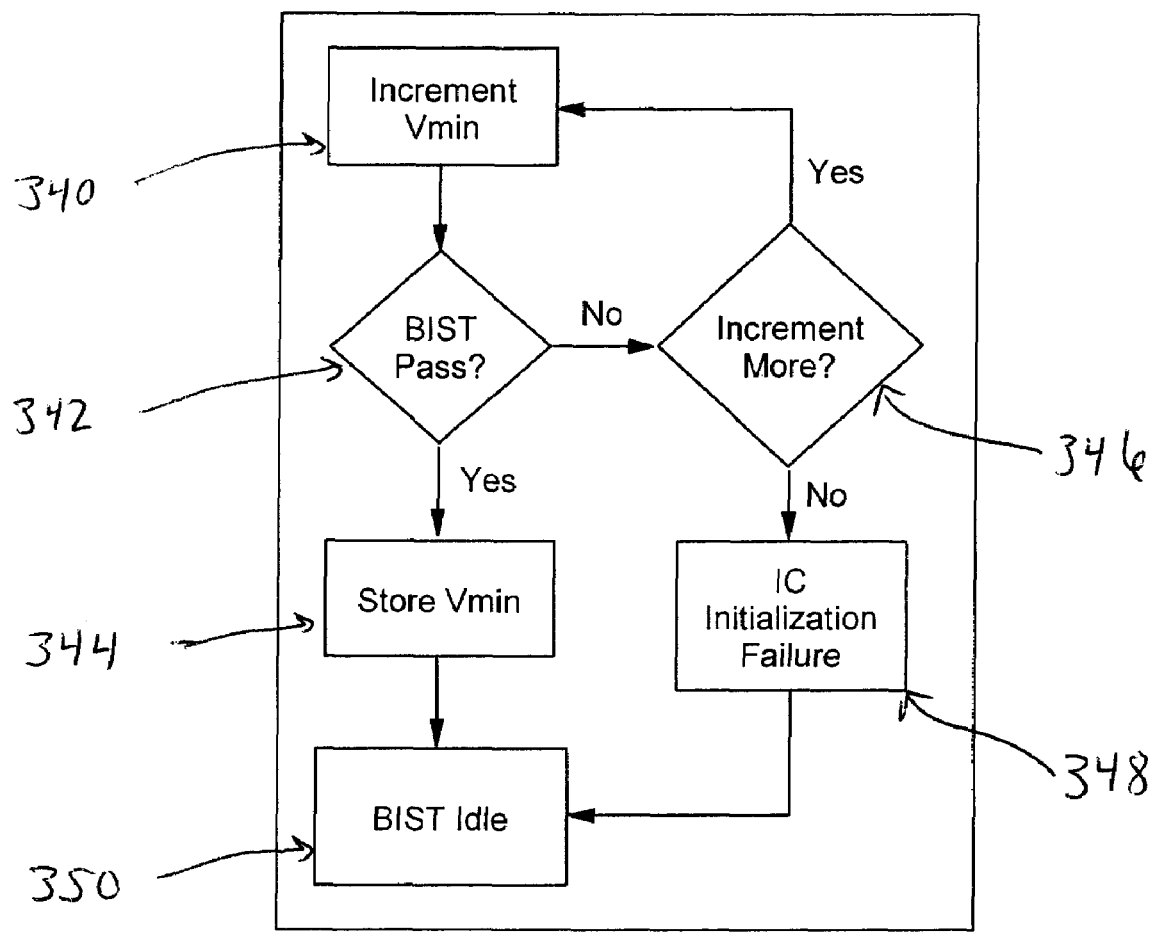
FIG. 7a is a diagram illustrating a method for incrementing the minimum operating voltage of an integrated circuit in response to built-in-self-test results according to the present invention.

FIG. 7a illustrates one embodiment of the "Increment Vmin" routine 328 illustrated in FIG. 6. Vmin is incremented by some amount above the initial operating voltage supplied by the Vregulator 340 (i.e. the predetermined voltage). The actual amount of increment may be selected based upon on a number of considerations and any increment amount selected is within the scope of this invention. For example, the increment amount may be 50 mV. After incrementing Vmin by the increment amount, the self test is again executed by the BIST engine 342. If the self test passes, Vmin has been determined and that value is stored 344 either within the IC (e.g. ROM, non-volatile memory, volatile memory such as embedded DRAM, register, fuses, etc.) or off the IC (e.g. hard-drive, flash memory, etc.). If the self test fails and if Vmin is capable of being incremented 346, Vmin is incremented again 340 and the self test is executed again 342. This process is repeated until either the self test passes 344 (at which point Vmin is determined and stored) or Vmin is longer capable of being incremented 346 because the maximum voltage of the Vregulator is met without successful self test. If this occurs, an initialization failure occurs 348 and an appropriate error routine is executed by the IC. Such error techniques are well known in the art and outside the scope of this invention. Upon completion of the self test routine, the BIST engine returns to an idle state 350.

Figure 7B:
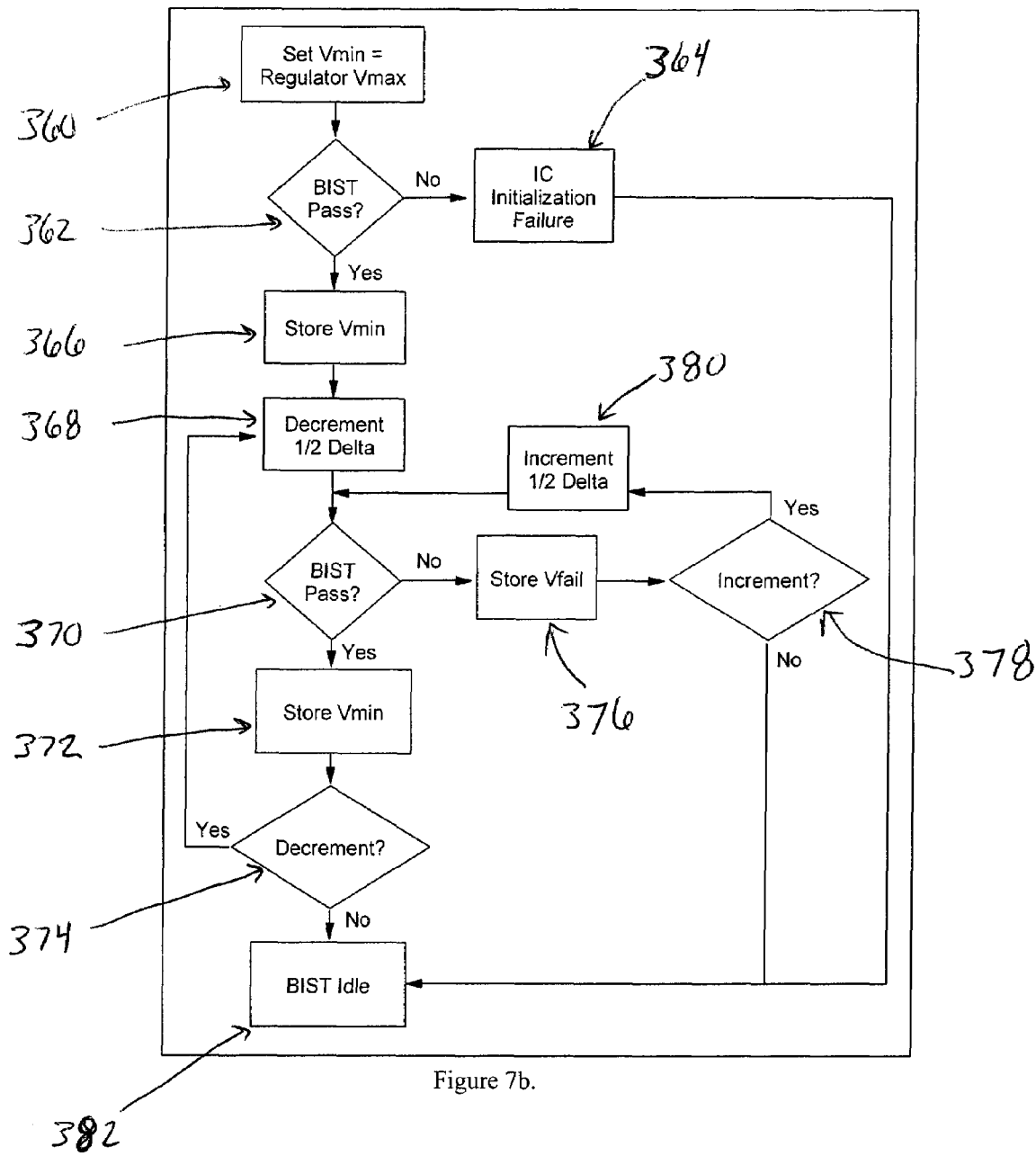
FIG. 7b is a diagram illustrating an alternate method for incrementing the minimum operating voltage of an integrated circuit in response to built-in-self-test results according to the present invention.

FIG. 7b illustrates an alternate embodiment of the "Increment Vmin" routine 328 illustrated in FIG. 6. Vmin is initially set to the maximum voltage at which the Vregulator is capable of functioning 360. If the IC fails at this voltage 362, an initialization failure occurs 364 and an appropriate error routine would be executed by the IC. Error routines are well known in the art and outside the scope of this invention. If the self test passes at 362, Vmin has been determined and that value is stored 366 either within the IC (e.g. ROM, nonvolatile memory, volatile memory such as embedded DRAM, register, fuses, etc.) or off the IC (e.g. hard-drive, flash memory, etc.). Next, the BIST engine sets Vmin at a value halfway between the stored Vmin and the predetermined operating voltage 368. The self test is again executed 370 and if it passes, Vmin is stored 372 (replacing the previous value). If the routine is capable of decrementing 374 (decrement delta is not too small), the BIST engine sets Vmin at a value halfway between the newly stored Vmin and the predetermined operating voltage 368. This process is repeated until either the self test fails at 370 (and BIST engine checks to see if the routine may be incremented) or the routine can no longer decrement at 374 (at which point Vmin is determined). If the self test fails, the BIST engine stores the failing voltage 376 (Vfail) and checks to see if Vmin may be incremented halfway between Vmin and Vfail 378 (is increment delta too small?). If Vmin may be incremented, it is incremented to a value halfway between Vmin and Vfail 380 and the self test is executed again at 370. This process is repeated until the increment and decrement intervals have become too small (e.g. the increment/decrement interval is smaller than the amount by which the variable voltage regulator is capable of being adjusted by, or in other words, the tolerance level of the regulator has been met), at which point Vmin is finally determined. Upon completion of the self test routine, the BIST engine returns to an idle state 382.

Figure 8A:
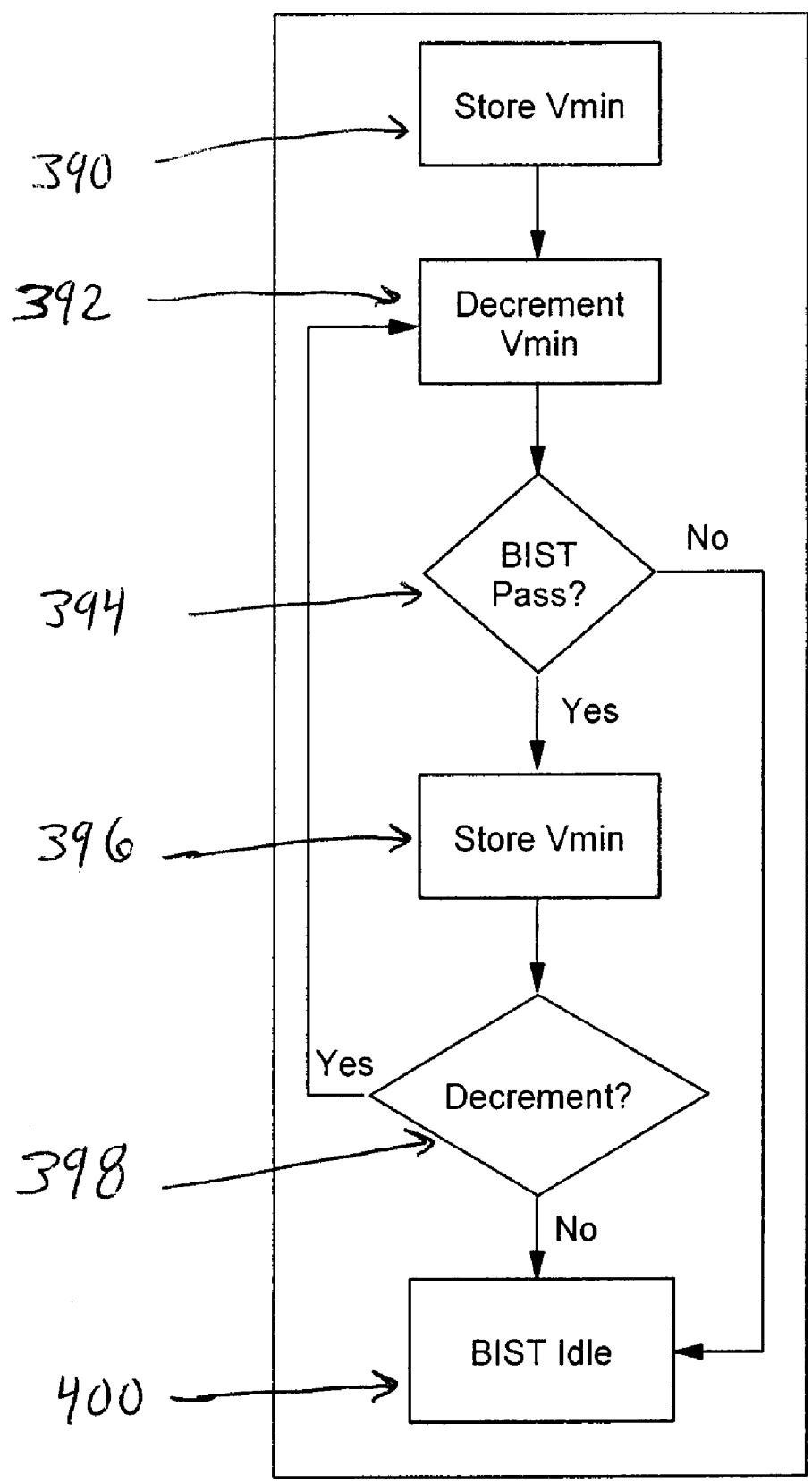
FIG. 8a is a diagram illustrating a method for decrementing the minimum operating voltage of an integrated circuit in response to built-in-self-test results according to the present invention.

FIG. 8a illustrates one embodiment of the "Decrement Vmin" routine 330 illustrated in FIG. 6. Vmin is initially stored 390 either within the IC (e.g. ROM, nonvolatile memory, volatile memory such as embedded DRAM, register, fuses, etc.) or off the IC (e.g. hard-drive, flash memory, etc.) and then decremented 392 by some amount below the initial operating voltage supplied by the Vregulator (predetermined voltage). The actual amount of decrement may be selected based upon on a number of considerations and any amount selected is within the scope of this invention. For example, the decrement amount may be 50 mV. After decrementing Vmin by the decrement amount, the self test is executed by the BIST engine 394. If the self test fails at 394, Vmin has been determined. If the self test passes at 394, Vmin is stored 396, decremented 392, and the self test is executed again 394. This process is repeated until either the self test fails at 394 (at which point Vmin is determined) or the minimum voltage of the Vregulator is met 398. If this occurs, Vmin is the minimum voltage capable of being supplied by the Vregulator. Upon completion of the self test routine, the BIST engine returns to an idle state 400.

Figure 8B:
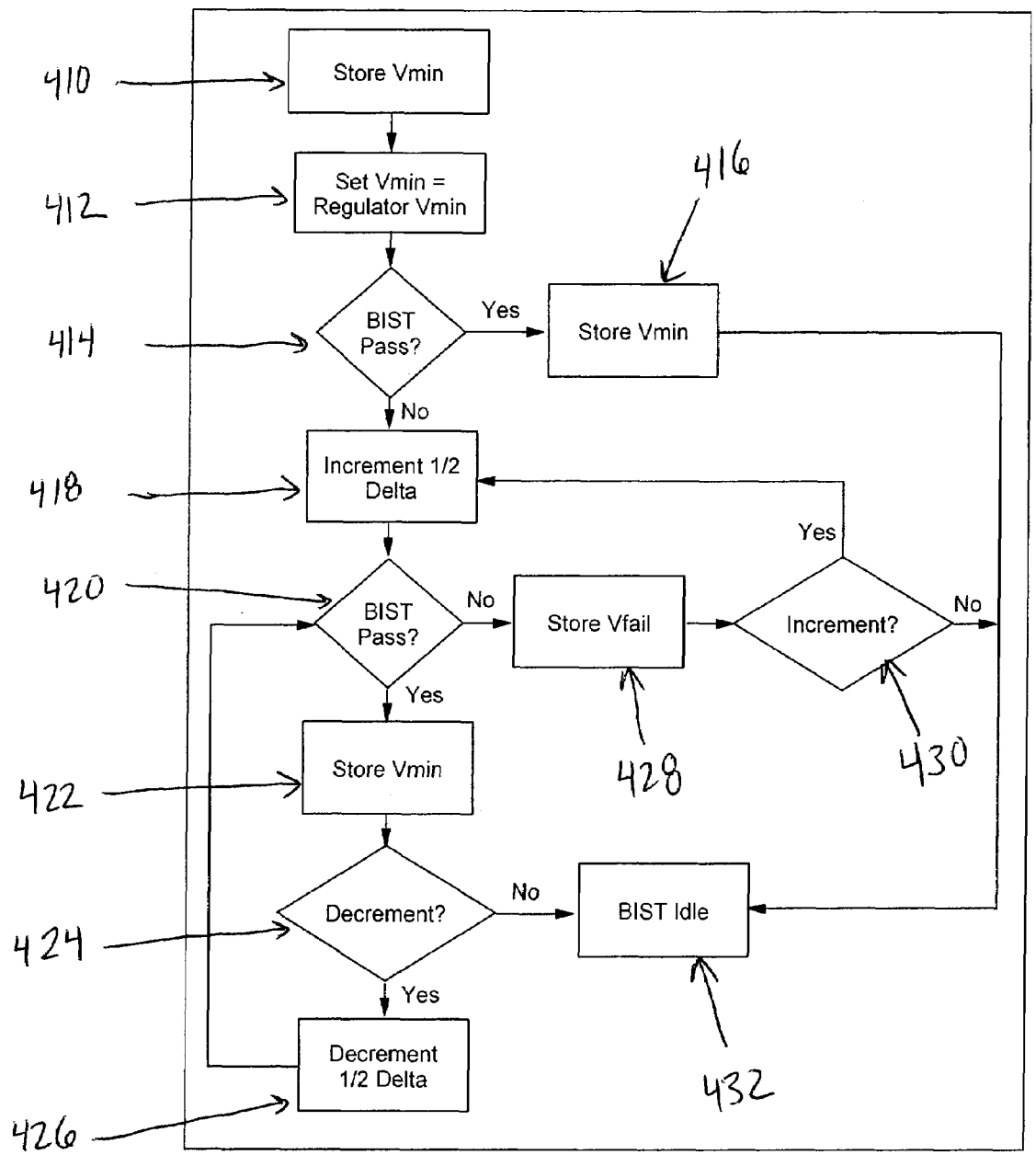
FIG. 8b is a diagram illustrating an alternate method for decrementing the minimum operating voltage of an integrated circuit in response to built-in-self-test results according to the present invention.

FIG. 8b illustrates an alternate embodiment of the "Decrement Vmin" routine 330 illustrated in FIG. 6. Vmin is initially stored 410 either within the IC (e.g. ROM, nonvolatile memory, volatile memory such as embedded DRAM, register, fuses, etc.) or off the IC (e.g. hard-drive, flash memory, etc.). Vmin is then set to the minimum voltage at which the Vregulator functions 412. If the self test 414 passes at this voltage, Vmin is determined and stored 416. If the self test fails at 414, Vmin is incremented to a value halfway between the minimum voltage at which the Vregulator functions and the stored value of Vmin 418 (predetermine voltage). If the self test 420 passes at this voltage, Vmin is stored 422. If the routine is capable of decrementing Vmin 424 (decrement delta is not too small), Vmin is decremented halfway between the present value of Vmin and the minimum voltage at which the Vregulator functions 426. This process is repeated until either the routine can no longer decrement at 426 (decrement delta is too small) or until the self test fails at 420. If the routine can no longer decrement at 426, Vmin has been determined. If the self test fails at 420, the point at which it fails is recorded 428 (Vfail) and the BIST engine determines if Vmin is capable of being incremented 430 (is increment delta too small?). If Vmin is not capable of being incremented at 430 (increment delta is too small), Vmin has been determined. If Vmin is capable of being incremented at 430, Vmin is incremented halfway between Vfail and the stored value of Vmin 418. This process is repeated until the increment and decrement intervals have become too small (e.g. the increment/decrement interval is smaller than the amount by which the variable voltage regulator is capable of being adjusted by, or in other words, the tolerance level of the regulator), at which point Vmin is finally determined. Upon completion of the self test routine, the BIST engine returns to an idle state 432.

Figure 9:
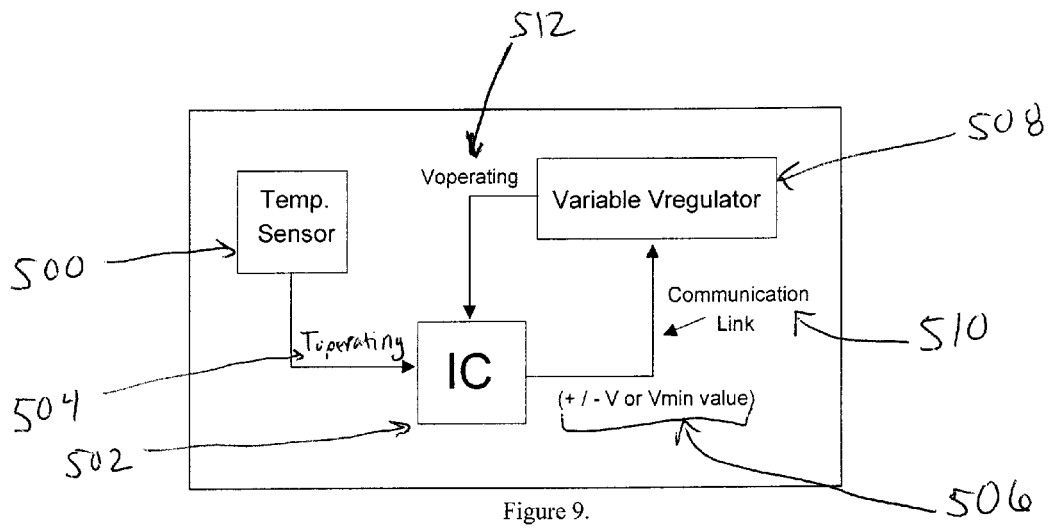
FIG. 9 is a diagram illustrating an end system incorporating an adaptive feedback mechanism for controlling the operating voltage of an integrated circuit in response to operating temperature of the integrated circuit according to the present invention.

FIG. 9 illustrates a third embodiment where system temperature may be utilized to reduce the operating voltage of an IC, and thus, power consumption. Because the operating frequency of an IC is inversely related to temperature, an IC tested at worst-case system operating temperature, but which is actually operating at some temperature below that condition, may be operated at a lower voltage and still satisfy the system performance requirements. The end system contains temperature monitoring system 500 (e.g. thermal couple, thermal monitor, etc.) that is capable of measuring the temperature of the system near IC 502 and transmitting that temperature data to the IC for processing 504. In an alternate embodiment, a temperature sensing mechanism is contained within the IC. Techniques for measuring temperature using devices contained within semiconductor circuits are well known and described more fully in U.S. Pat. No. 3,881,181 entitled SEMICONDUCTOR TEMPERATURE SENSOR, by Khajezadeh, U.S. Pat. No. 4,670,731 entitled Semiconductor temperature sensor, by Zeile et al. and U.S. Pat. No. 6,046,492 entitled Semiconductor temperature sensor and the method of producing the same, by Machida et al., the subject matter of which are hereby incorporated by reference in their entirety.

IC 502 receives temperature data 504 (Toperating) and processes it to determine how much the operating voltage may be reduced and still maintain functionality. This can be done in a number of ways based upon the frequency versus voltage and frequency versus temperature relationships previously described and illustrated in FIGS. 1 and 2. These relationships may be stored within IC 502 (e.g. EEPROM, nonvolatile memory, ROM, embedded flash memory, fuses, etc.) or may be obtained off-chip from another storage device or may be supplied by an external program. Additionally, the temperature at which IC 502 was initially tested (Ttest) is also stored within the IC (e.g. EEPROM, nonvolatile memory, ROM, embedded flash memory, fuses, etc.) or may be obtained off-chip from another storage device or may be supplied by an external program.

Figure 1:
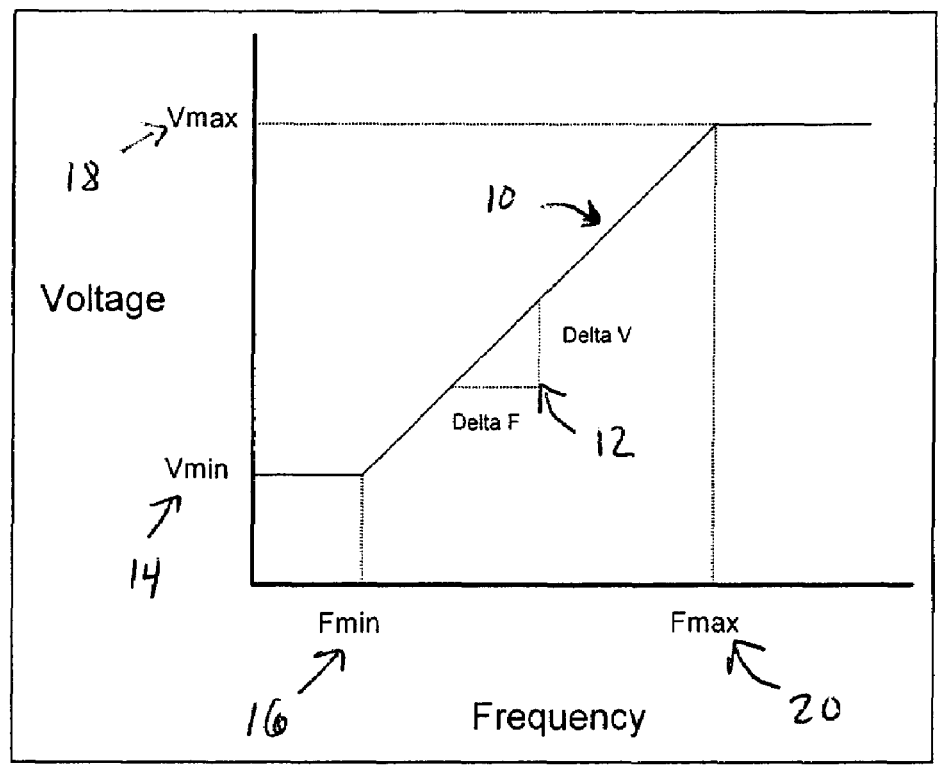
FIG. 1 is a diagram illustrating the frequency/voltage response of an integrated circuit according to the prior art.
Figure 2:
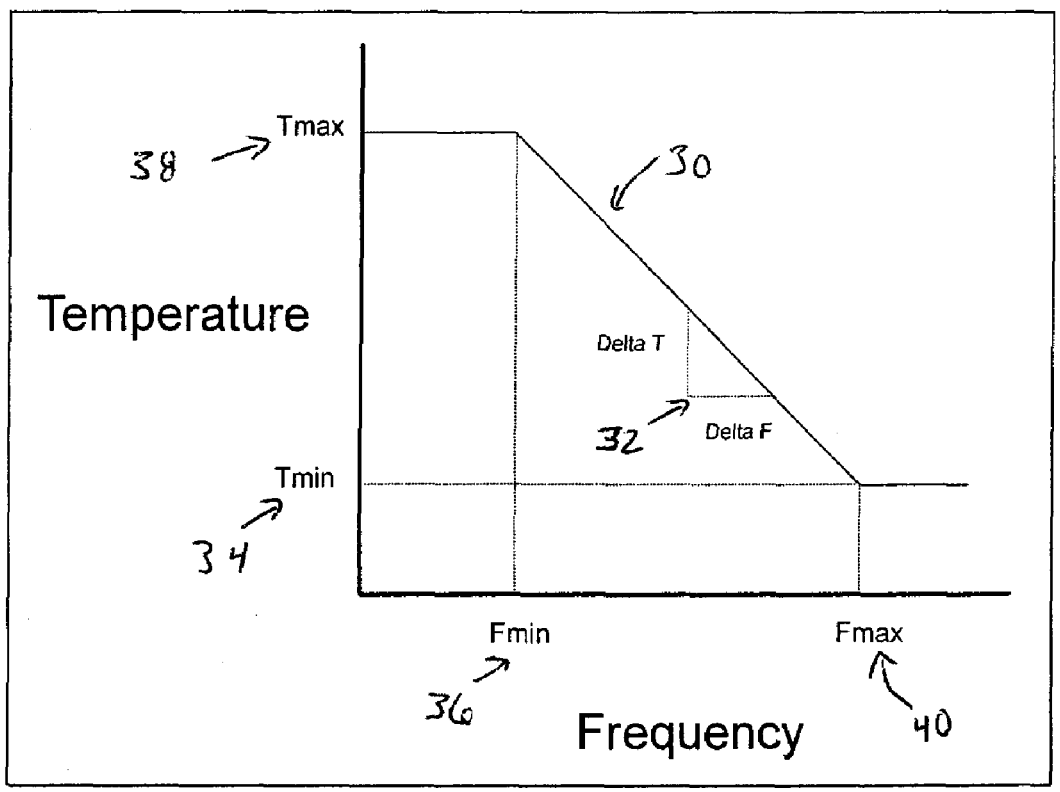
FIG. 2 is a diagram illustrating the frequency/temperature response of an integrated circuit according to the prior art.

Based upon Ttest and the relationships illustrated in FIGS. 1 and 2, IC 502 determines the minimum operating voltage at which the IC will still function properly at the Toperating. For example, IC 502 may multiply the delta between Ttest and Toperating by either one, or both, of the relationships illustrated in FIGS. 1 and 2 to determine by how much, if at all, Vmin may be modified (delta Vmin): delta Vmin=[(Ttest Toperating)×(Delta F/Delta T)×(Delta V/Delta F)]. This value may be reduced by some amount to account for inaccuracies (e.g. guard-band). If IC 502 is running some number of degrees cooler than Ttest, this translates into an increased operating frequency margin as previously explained, thus translating into an increased operating voltage margin. The inverse holds true if IC 502 is operating some number of degrees above than Ttest. For illustration purposes, Ttest=105 C, Toperating=65 C, Delta F/Delta T=10 Mhz/10 C and Delta V/Delta F =10 mV/20 Mhz. Delta Vmin would then be 20 mV. Therefore, the operating voltage of the IC could be reduced by 20 mV and still maintain functionality.

Vmin signal 506 is transmitted to Vregulator 508 over communication link 510 in FIG. 9 in accordance with the first and second embodiments as illustrated in FIG. 3 and FIG. 5 and as previously described. Vregulator 508 sets its output voltage 512 in response to Vmin signal 506 in accordance with the first and second embodiments as illustrated in FIG. 3 and FIG. 5 and as previously described. Temperature feedback may be used in accordance with both embodiments as illustrated in FIG. 3 and FIG. 5 and as previously described.

Figure 10:
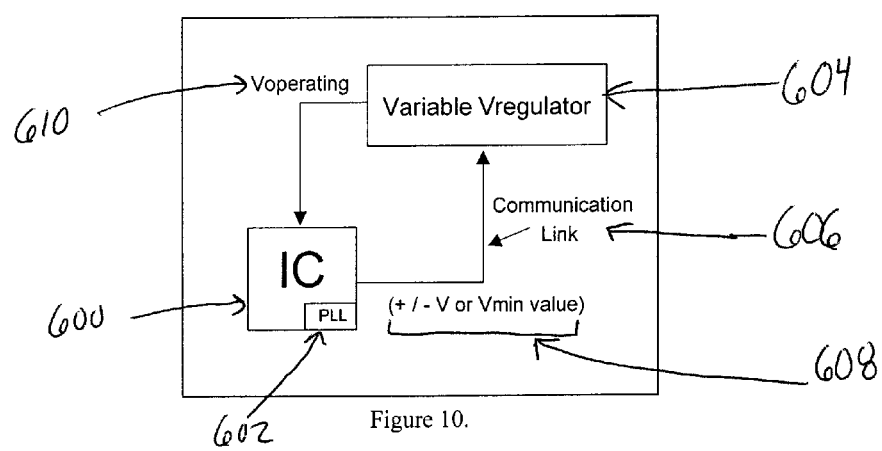
FIG. 10 is a diagram illustrating an end system incorporating an adaptive feedback mechanism for controlling the operating frequency of an integrated circuit according to the present invention.

FIG. 10 illustrates a system in which the embodiments illustrated in FIGS. 3, 5, and 9 are adapted to optimize system performance instead of (or in addition to) reducing power consumption as previously described. The embodiments illustrated in FIGS. 3, 5, and 9 may utilize the voltage and temperature relationships illustrated in FIGS. 1 and 2 to optimize system performance. As previously discussed, the maximum operating conditions of an IC are usually not determined at manufacturing test, and even if they are, this information is not utilized in the end system. For example, most ICs that pass manufacturing test at worst-case conditions are capable of operating in the end system at a lower voltage, higher frequency, or both while maintaining functionality. The embodiments illustrated in FIGS. 3, 5, and 9 utilize this principle to adjust the operating voltage of the IC so that power consumption may be minimized. However, the same principle may be utilized to increase the operating frequency of the IC (or optimize frequency and voltage for ideal power and performance). The operating frequency of IC 600 may be adjusted by programmable Phase-Locked Loop 602 ("PLL") based upon the operating characteristics of IC 600 in the end system.

Vmax is the maximum operating voltage at which IC 600 will function properly in the end system. In accordance with the embodiments illustrated in FIGS. 3, 5 and 9, Vmax may be determined either at test and stored within IC 600 or may be determined using a self-test routine. IC 600 transmits voltage control information (e.g. Vmax plus guardband) to Vregulator 604 over communication link 606 as either an increment/decrement signal or as a data signal representing the value of Vmax 608 in accordance with the first embodiment as previously described and illustrated in FIGS. 3. Vregulator 604 sets its output voltage 610 in response to Vmax signal 608 in accordance with the first embodiment as previously described and illustrated in FIGS. 4a and 4b.

Figure 11:
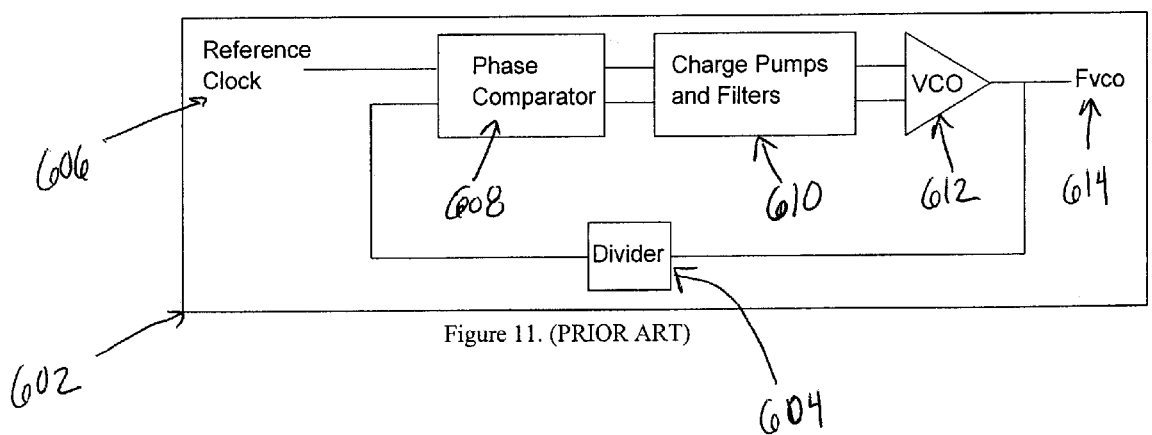
FIG. 11 is a diagram illustrating a programmable phase-locked-loop according to the prior art.

FIG. 11 illustrates a typical programmable PLL 602, which are extensively used to control oscillators so that they maintain a constant phase angle relative to a reference signal. Typical programmable PLL 602 contains a frequency divider circuit 604, reference clock input 606, phase comparator circuit 608, charge pump and filter circuits 610, VCO circuit 612 and produce operating frequency output 614 (Fvco). Programmability of the frequency divider circuit 604 of programmable PLL 602 is well known in the art and enables adjustment of the operating frequency of the IC (Fvco). Techniques are well known in the art for controlling the programmability of frequency divider circuit 604. By varying frequency divider circuit 604, Fvco 614 may be changed in small increments.

Programmable PLLs, like the one illustrated in FIG. 11, are described more fully in U.S. Pat. No. 6,009,139, entitled Asynchronously programmable frequency divider circuit with a symmetrical output, by Austin et al.; U.S. Pat. No.

6,040,725, entitled Dynamically configurable variable frequency and duty cycle clock and signal generation, by Lee et al.; U.S. Pat. No. 6,515,530, entitled Dynamically scalable low voltage clock generation system, by Boerstler et al.; and U.S. Pat. No. 6,522,207, entitled Apparatus and method for dynamic frequency adjustment in a frequency synthesizer, by Boerstler et al., the subject matter of which are hereby incorporated by reference in their entirety.

Figure 12:
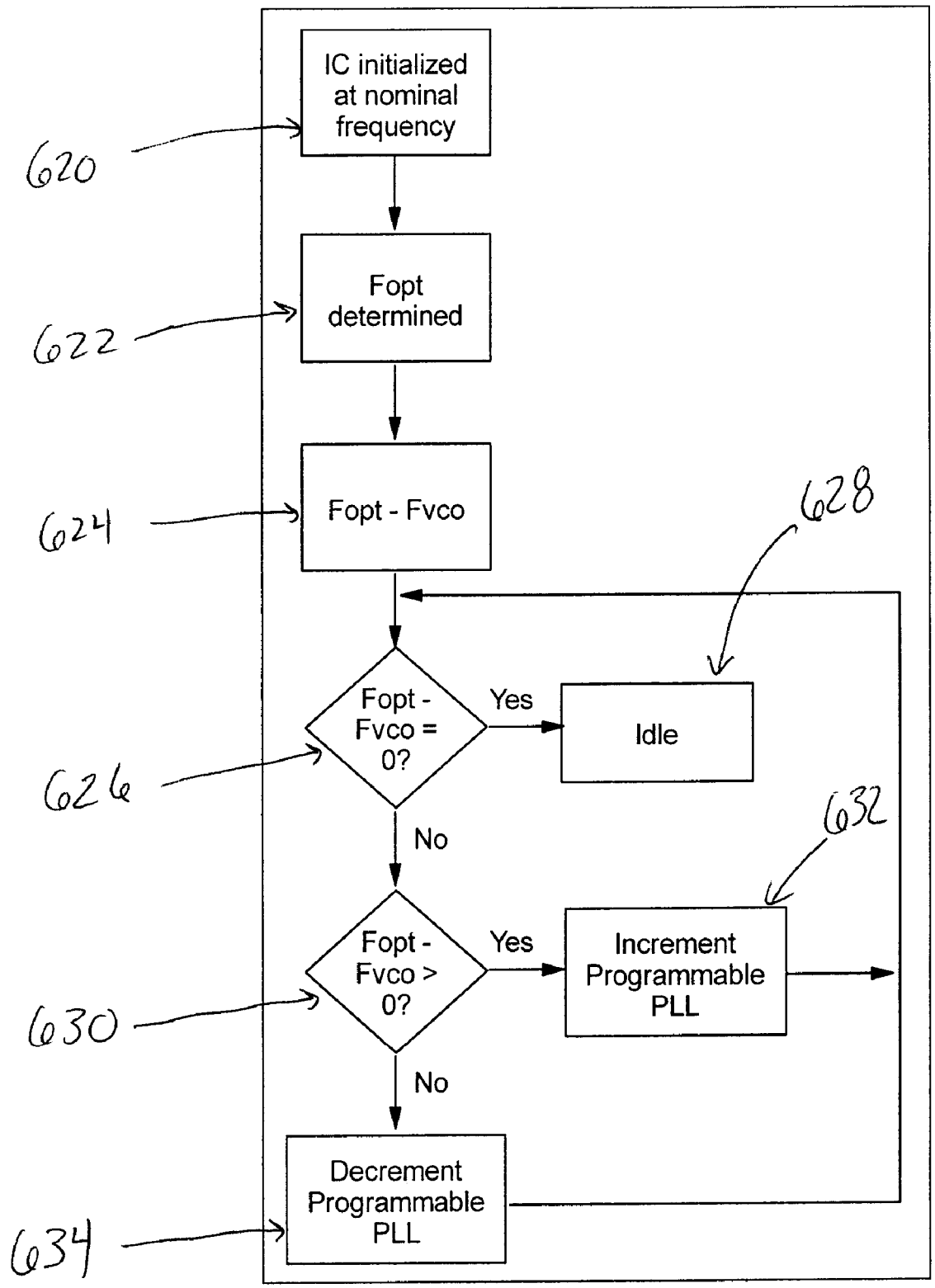
FIG. 12 is a diagram illustrating a method for determining the optimum operating frequency of an integrated circuit according to the present invention.

FIG. 12 illustrates the process by which an IC adjusts its operating frequency based upon the system previously described. The IC is initially operated at some nominal operating frequency 620. This frequency is predetermined and set by the programmable PLL. This predetermined value is a value at which all ICs are expected to function in the end system (e.g. nominal or worse-cast value). The IC uses Vmax and the voltage/frequency response illustrated in FIG. 1 to determine the maximum frequency at which the IC will function in the end system. The voltage/frequency response illustrated in FIG. 1 may be stored on-chip or may be supplied by some other component in the end system, an external program, or end-user. Using Vmax and the voltage/frequency response (i.e. the slope of the curve), an optimal operating frequency (Fopt) is determined 622. Fopt may be any frequency between the nominal operating frequency and the maximum operating frequency as determined by Vmax and the voltage/frequency response illustrated in FIG. 1. Fopt is the frequency where Vmax intersects the curve of the frequency/voltage response illustrated in FIG. 1. Fopt may be reduced by some amount to account for inaccuracies (e.g. guardband). The IC then compares Fopt to Fvco 624 (the present frequency output of the programmable PLL). If at 626 Fopt–Fvco equals zero (or at least Fopt Fvco is within the programmable PLL's tolerance, and thus the divider circuit of the PLL can not be further adjusted), the IC does not adjust the output of the PLL 628. If Fopt–Fvco is positive at 630, the IC transmits a signal to the programmable PLL indicating that the PLL is to increase Fvco until it equals Fopt 632. If Fopt–Fvco is negative at 630, the IC transmits a signal to the programmable PLL indicating that the PLL is to decrease Fvco until it equals Fopt 634. The performance of the IC is maximized when Fvco is set to Fopt. The programmable PLL changes Fvco by adjusting divider circuit 604 of FIG. 11 in accordance with the signal received from the IC. For example, if Fopt=2.2 GHz, Fvco=2.0 GHz and divider circuit 604 is capable incrementing or decrementing Fvco in 100 Mhz increments, the programmable PLL would adjust divider circuit 604 by 2 increments of 100 MHz, thus resulting in a Fvco of 2.2 GHz.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An apparatus for adaptively controlling power consumption within an electronic system, said apparatus comprising:
    an integrated circuit adapted to transmit voltage control information corresponding to a difference between a minimum operating voltage uniquely determined for the integrated circuit plus a guard band and a predetermined nominal voltage selected for a family of integrated circuits;
    a storage element coupled to said integrated circuit, adapted to store said minimum operating voltage;
    a variable voltage regulator coupled to said integrated circuit, adapted to receive said voltage control information from said integrated circuit, and supply an operating voltage to said integrated circuit in response to and representative of said voltage control information; and
    a communication link coupled to said integrated circuit and said variable voltage regulator, adapted to link said integrated circuit to said variable voltage regulator so that said integrated circuit may transmit said voltage control information to said variable voltage regulator.

2. The apparatus of claim 1 wherein said minimum operating voltage is determined during external testing of said integrated circuit.

3. The apparatus of claim 1 wherein said storage element is a nonvolatile memory.

4. The apparatus of claim 1 further comprising a temperature sensing means coupled to said integrated circuit and adapted to measure and transmit temperature data to said integrated circuit.

5. The apparatus of claim 4 wherein said integrated circuit is further adapted to modify said voltage control information in response to said temperature data.

6. The apparatus of claim 1 further comprising a built-in-self-test circuit coupled to said integrated circuit, adapted to test said integrated circuit and determine said minimum operating voltage.

7. The apparatus of claim 6 further comprising a temperature sensing means coupled to said integrated circuit and adapted to measure and transmit temperature data to said integrated circuit.

8. The apparatus of claim 7 wherein said integrated circuit is further adapted to modify said voltage control information in response to said temperature data.

9. A method of adaptively controlling power consumption within an electronic system, said method comprising the steps of:
    testing an integrated circuit to determine a minimum operating voltage uniquely determined for said integrated circuit;
    storing said minimum operating voltage;
    transmitting a signal to a variable voltage regulator, wherein said signal corresponds to a difference between said minimum operating voltage uniquely determined for said integrated circuit plus a guard band and a predetermined nominal voltage selected for a family of integrated circuits;
    programming an output voltage of said variable voltage regulator in response to and representative of said signal; and
    supplying said output voltage to said integrated circuit.

10. The method of claim 9 wherein said minimum operating voltage is determined during external testing of said integrated circuit.

11. The method of claim 10 wherein said minimum operating voltage is determined by testing timing critical paths within said integrated circuit.

12. The method of claim 9 wherein said minimum operating voltage is determined by testing said integrated circuit with a built-in-self-test circuit.

13. The method of claim 12 wherein said testing comprises the steps of:
    initializing said built-in self-test circuit;
    accessing test patterns;
    executing said testing; and adjusting said minimum operating voltage of said integrated circuit in response to said testing.

14. The method of claim 13 wherein said test patterns exercise timing critical paths within said integrated circuit.

15. The method of claim 9 further comprising:
measuring temperature data; and
transmitting said temperature data to said integrated circuit.

16. The method of claim 15 further comprising modifying said signal in response to said temperature data.

17. A power control arrangement, comprising:
means for testing an integrated circuit to determine a minimum operating voltage uniquely determined for said integrated circuit;
means for storing said minimum operating voltage;
means for transmitting a signal to a variable voltage regulator, wherein said signal corresponds to a difference between said minimum operating voltage uniquely determined for said integrated circuit plus a guard band and a predetermined nominal voltage selected for a family of integrated circuits;
means for programming an output voltage of said variable voltage regulator in response to and representative of said signal; and
means for supplying said output voltage to said integrated circuit.

* * * * *